Oct. 23, 1923.                    H. E. DETWILER                    1,471,835
ANTISKID CHAIN HOOK
Filed May 9, 1922
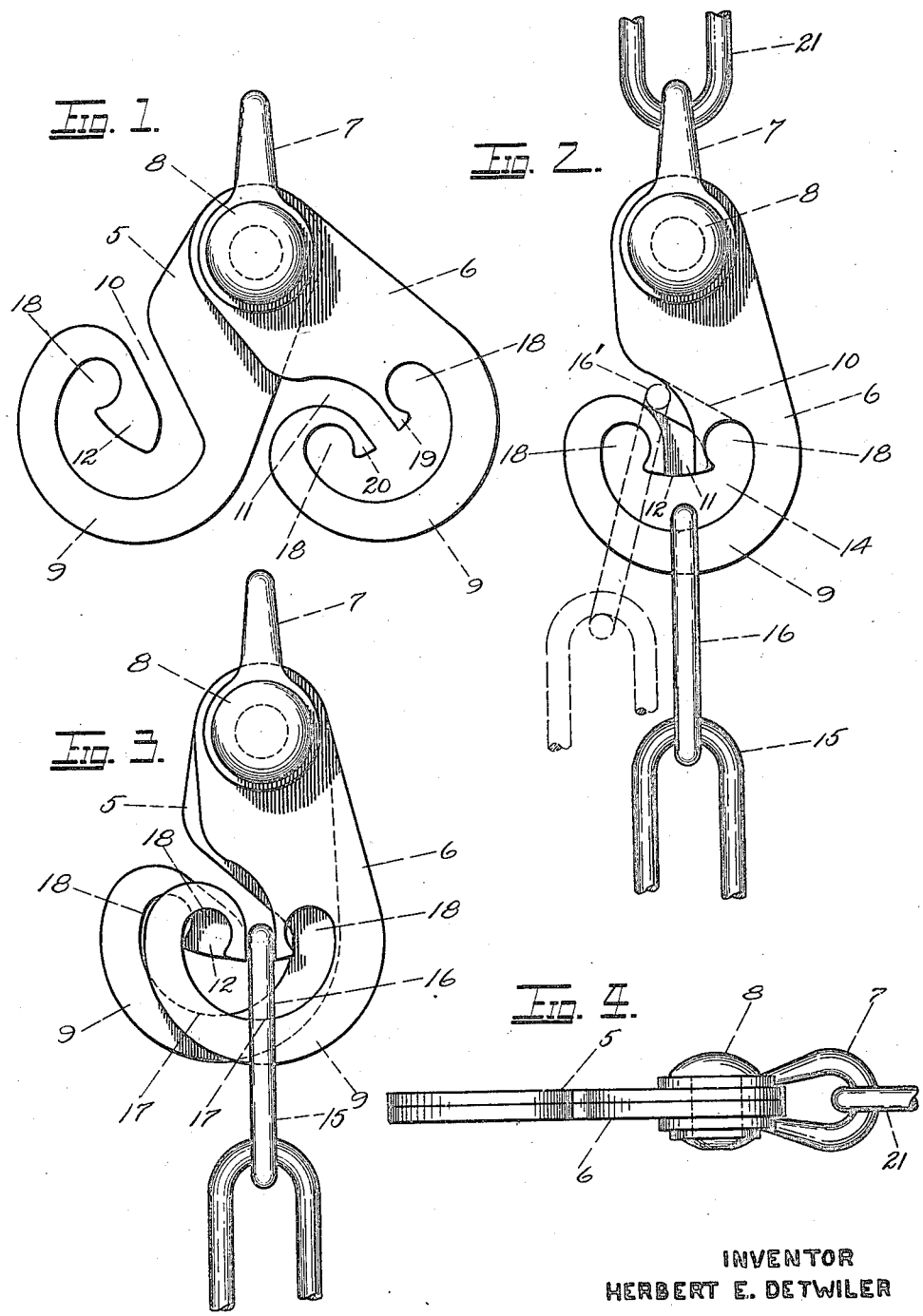
INVENTOR
HERBERT E. DETWILER
BY
ATTORNEY Patented Oct. 23, 1923.

1,471,835

UNITED STATES PATENT OFFICE.

HERBERT E. DETWILER, OF YORK, PENNSYLVANIA.

ANTISKID-CHAIN HOOK.

Application filed May 9, 1922.  Serial No. 559,546.

*To all whom it may concern:*

Be it known that I, HERBERT E. DETWILER, a citizen of the United States, residing at York, in the county of York and State of Pennsylvania, have invented new and useful Improvements in Antiskid-Chain Hooks, of which the following is a specification.

This invention relates to hooks for connecting the ends of anti-skid chains; the object of this invention is to provide a new type of hook which is simple and cheap to manufacture.

Other objects will be apparent from the following description, taken in connection with the accompanying drawing, and in which similar numerals refer to similar parts throughout the several views.

Fig. 1, shows a construction of my hook embodying the principal features of my invention.

Fig. 2, represents the hook as connected to the ends of a chain.

Fig. 3, discloses the method by which the chain link is entered into the hook.

Fig. 4, is a side view of Fig. 2, the chain being omitted.

In the drawing, the plates 5 and 6 are pivotally connected to the swivel 7 through the rivet 8. Each of the plates 5 and 6 is provided with a hook 9; their form being adapted to coincide to the extent shown in Fig. 2.

The outline of the plates 5 and 6 is adapted to coincide throughout, except for the slots 10 and 11. These slots differ to the extent necessary to make the end 12 of the hook on plate 5 adapted to close the slot 11 in plate 6, thereby forming an eye 14.

For connecting the end 15 of the chain to this device, the link 16 is entered into the slots 10 and 11, as shown in light broken lines at 16'. Upon pulling the link into the eye 14 the plates 5 and 6 turn on the rivet 8 to the position shown in Fig. 3, thereby permitting the link to enter the eye. Tension on the end 15 of the chain draws the plates 5 and 6 to substantially true alignment, thereby closing the slot 11 as shown in Fig. 2. This closing action is readily understood by referring to Fig. 3; it is very apparent that the plates 5 and 6 will move until the link 16 finds the lowest point in the arc indicated by 17.

Notches 18 are provided in the eye 14 to receive the link 16, in the event that the tension on the chain 15 is released, thereby preventing the slot 11 from opening which might permit the link 16 to disengage with the hooks 9.

It is very improbable when the chain becomes slack, that the plates 5 and 6 will take the position relative to each other as shown in Fig. 3, and that at this instant the link 14 will by chance enter the slot 11 and disengage itself from the hooks 9. The ends 12 and 20 of the hooks 9, with the projecting end 19 are especially provided to interfere with such action, and I have found them to be very effective in accomplishing this result.

The opposite end 21 of the chain engages with the swivel 7 as shown in Figs. 2 and 4.

Having thus described my invention, what I claim, and desire to secure by United States Letters Patent is as follows:

1. A chain connector comprising two plates pivotally connected at their ends, a hook on the other end of each of said plates, the end of the hook on one plate being adapted to close the entrance to the hook of the other plate, thereby forming an eye, and the ends of said hooks projecting downward into said eye, thereby forming notches adapted to receive a chain link through which said hook entrance is held closed.

2. A chain connector comprising two plates pivotally connected at their ends, an eye in the other end of each of said plates, the outline of said eyes being adapted to coincide, slots entering the side edge of each of said plates and communicating with said eye, said slots coinciding at the edges of said plates but diverging as they near the said eye, and notches in said eyes adapted to coincide and receive a chain link, thereby preventing movement of said plates relative to each other.

3. A chain connector comprising two plates pivotally connected at their ends, an eye in the other end of each of said plates, slots entering the side edge of each of said plates and communicating with said eye, said slots coinciding at the edges of said plates but diverging as they near the said eye, hooks formed by said eyes and said slots, the end of the hook on one plate being adapted to close the slot of the other plate, and notches in said eye adapted to receive a chain link and thereby prevent opening of said slots.

In testimony whereof I affix my signature.

HERBERT E. DETWILER.